Feb. 24, 1953 — S. S. KISTLER — 2,629,161

METHOD OF MAKING CERAMIC ARTICLES

Filed Feb. 1, 1949

Inventor
SAMUEL S. KISTLER
By Geo. C. Sompsup
Attorney

Patented Feb. 24, 1953

2,629,161

UNITED STATES PATENT OFFICE 2,629,161

METHOD OF MAKING CERAMIC ARTICLES

Samuel S. Kistler, West Boylston, Mass., assignor to Norton Company, Worcester, Mass., a corporation of Massachusetts Application February 1, 1949, Serial No. 73,938

1 Claim. (Cl. 25—156)

The invention relates to surface plates, liners and the like and method of making the same.

One object of the invention is to make a superior surface plate, for measuring and gaging parts in machine shops and the like. Another object of the invention is to manufacture highly wear resistant parts for mixing machines and the like. Another object of the invention is to provide an improved method for making liners for the cylinders of internal combustion engines, steam engines, pumps and the like, so that the liners will be extremely resistant to wear.

Another object of the invention is to provide a more facile method for the manufacture of dense, hard refractory abrasion resistant ceramic bodies. Another object of the invention is to provide a method of manufacturing certain types of ceramic bodies without the necessity of utilizing extremely high pressures for molding. Another object of the invention is to manufacture articles of the class indicated out of ceramic materials by ramming as distinguished from pressing, thereby increasing production and reducing the cost of manufacture. Another object of the invention is to provide a method of manufacturing ceramic bodies to make them more resistant to abrasion. Another object of the invention is to provide a method to increase versatility of manufacture in the ceramic arts as by simplifying manufacturing operations or by increasing the numbers of kinds of products which can be readily manufactured. Other objects of the invention are to provide superior abrasion resistant parts for various articles and machines such as gages, cylinders, journals and pumps of many descriptions including centrifugal pumps.

Other objects will be in part obvious or in part pointed out hereinafter.

Figure 1:
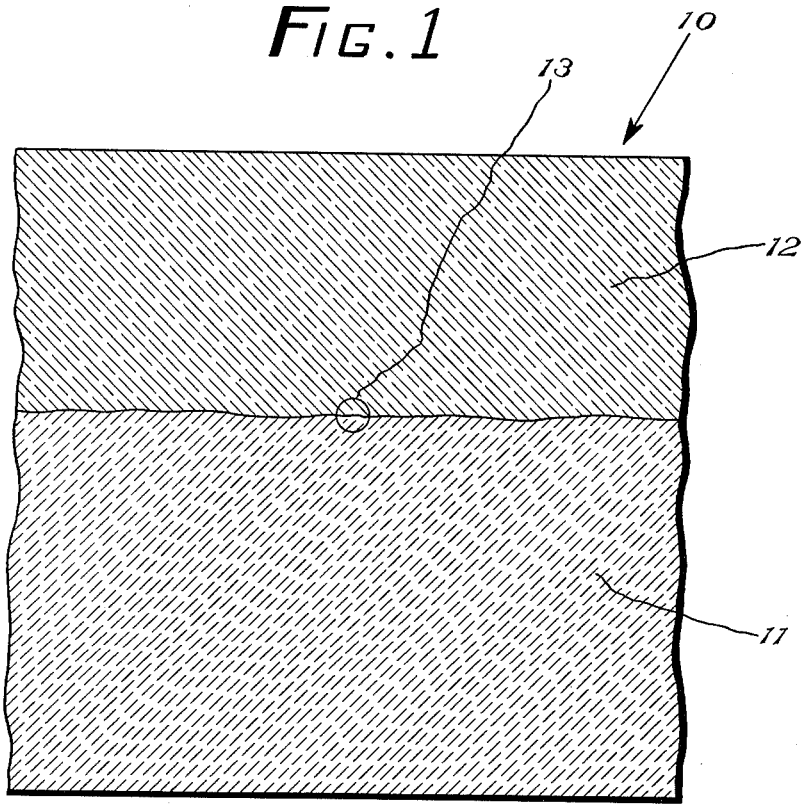
Figure 2:
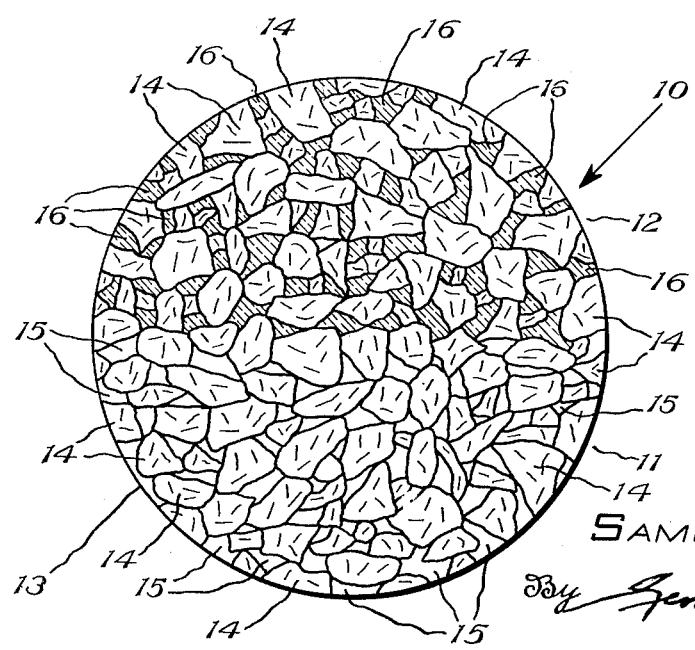

In the accompanying drawings illustrating an embodiment of the invention,

Figure 1 is a sectional view of a ceramic article embodying the invention on an enlarged scale, the section being illustrated in accordance with the current Patent Office conventions, Figure 2 is a highly magnified view of a portion of the section of Figure 1 illustrating the individual granules of alumina in elevation and the glass in the interstices between granules in a portion of the section.

Emery is usable according to the invention and emery is usually at least 90% $Al_2O_3$ and has a hardness between 7 and 9. Emery having a hardness at least that of zirconium oxide (from 7.5 to 8 on Mohs' scale) should be used in carrying out the invention and such emery will be at least 90% $Al_2O_3$. Corundum and artificial corundum are included and by the latter I mean fused alumina of various types, the product of the electric furnace. This material is, in fact, usually preferred. I may use the regular variety of fused alumina which is about 95% pure $Al_2O_3$ or the white variety which is better than 98% pure or the recently developed single crystal variety having a purity of 99%, or better. The grains of emery, corundum or artificial corundum, generically known as alumina or aluminum oxide, are sintered together in any of several methods known to the art. Since an object of the invention is to make a particularly dense body, I select grains of a variety of different grit sizes, for example from medium coarse to very fine in order that the grains may take up as much of the total volume as possible. One method of making a dense body of such grains is to proceed according to U. S. Patent No. 2,091,569 to Raymond R. Ridgway and Bruce L. Bailey according to which the grains are heated under pressure in a mold, for example a graphite mold, to a temperature at which they cohere. This makes a self-bonded piece of the particular compound. The above mentioned Patent No. 2,091,569 discloses a resistance tube furnace in which the above may be accomplished, but induction heating with the simultaneous application of pressure may also be used to make such self-bonded bodies.

On the other hand, I may use a small quantity of bentonite, mix it with grains of different grit sizes, press the piece in a mold, for eample under a pressure of 2500 pounds to the square inch, then remove the piece from the mold and fire it in an ordinary kiln at a heat treatment designated by cone 16. One percent of bentonite by weight on the total compound plus bentonite is a satisfactory proportion for making pieces in this manner. In this case the bond is not bentonite alone. There being so little bentonite it acts mainly as a flux and causes the granules of alumina to sinter and to grow together.

Articles made as above described are refractory and dense and if ground to a smooth surface will, relatively speaking, resist abrasion. But for many purposes they are not dense enough and not sufficiently resistant to abrasion. I have discovered how to increase the resistance to abrasion by as much as five-fold as measured by penetration tests by treating such fired bodies as will now be described.

*Example I*

| | Parts |
|---|---|
| Kentucky No. 5 ball clay | 1 |
| Feldspar | 1 |
| Dry sodium silicate | 1 |

A fired body of the above nature is coated with a mixture of the above ingredients to a depth of about ¼ of an inch. The body is then placed in a kiln and refired at a heat treatment of cone 10. The mixture of ball clay, feldspar and sodium silicate penetrates into the body. A fired plate of alumina self-bonded with the aid of bentonite as above described showed a sand blast penetration of 4.29 mm. before the ball clay, feldspar and sodium silicate were soaked in, while after soaking in the above mixture sand blast penetration under the same conditions was reduced to 0.85 mm.

*Example II*

A wear resistant rectangular plate was made of the following composition:

| | Parts |
|---|---|
| White grade alumina, 90 grit size | 54 |
| Tabular alumina | 45 |
| Bentonite | 1 |
| Dextrin | 1 |
| Water | 3.5 |

This was edge tamped into a rectangular form, dried and fired at cone 35 for three hours. It was a strong, hard, porous composition which showed a standard sandblast penetration of 5.4 millimeters.

A glass was made of the following composition:

| | Parts |
|---|---|
| $SiO_2$ | 52.5 |
| $Al_2O_3$ | .9 |
| $CaO$ | 3.0 |
| $Na_2O$ | 7.3 |
| $B_2O_3$ | 36.4 |

This was melted in a zircon crucible at 1200° C. and the above rectangular shape was soaked therein for one-half hour. After soaking the shape was stood on edge on a porous firebrick and allowed to drain in the furnace at 1200° C. The furnace was then allowed to cool.

The plate was found to have been saturated with glass to a depth between ¼″ and ½″. In the saturated surface layers virtually all of the pores had been filled with glass.

On subjecting this to the standard sandblast test it showed a penetration of 0.9 millimeter, thus showing very much higher abrasion resistance than the original plate before saturation with glass.

Referring now to the drawings, Figure 1 shows a section of an article 10, considerably magnified, consisting in a base portion 11 of granules of aluminum oxide, the granules being sintered together that is to say having actually grown together to form a continuous interlacing integral structure but with interstices. This base portion 11 is integrally united to a surface layer 12 comprising the same granules also sintered and grown together but in the surface layer 12 glass without anastomosing pores fills the interstices between the granules. In Figure 1 I have drawn a small circle 13 and the area of this circle 13 is shown greatly magnified in Figure 2. It will be seen that the area of this circle 13 includes part of the base portion 11 and part of the surface layer 12.

In Figure 2 can be seen the individual granules 14 both in the base portion 11 and in the layer 12. I have drawn irregular lines on the granules 14 to represent creases or other irregularities so that in the base portion 11 they will stand out from the interstices or pores 15. These pores 15 are anastomosing, that is to say they connect to one another in the third dimension. Interstices of anastomosing pores are a direct resultant of sintering or self bonding a mixture of irregular shaped granules.

Still referring to Figure 2, it will be seen that all the interstices between the granules 14 in the surface layer 12 are filled with glass 16 and this glass has no anastomosing pores.

According to my invention the surface layer 12 containing no anastomosing pores should be at least 1/16 inch thick but it is possible to make it a good deal thicker and it is desirable in many cases to do so. In my copending application, Serial No. 23,082, filed April 24, 1948, I have described and claimed liners for cylinders of internal combustion engines and the like comprising refractory cylinders enclosed in a metal sleeve shrunk thereon to put the refractory cylinders under compression. This present invention in one of its aspects is an improvement on the invention of my copending application aforesaid insomuch as the liner will wear much longer if it has an inside surface layer according to this invention, that is to say impregnated with glass having no anastomosing pores. And I find that more refractory structures can be made by self bonding or sintering the granules together as in accordance with the foregoing description rather than by using such a large proportion of vitrifiable bond in the first place that the granules are initially connected by vitrified ceramic material. In the case of such cylinder liners for internal combustion engines, pumps and the like, the layer 12 may be only 1/16 inch thick because the entire liner should be replaced when it has worn to the extent of 1/16 of an inch on the radius but this will not happen for years. On the other hand other articles such as impeller blades for centrifugal pumps which are pumping ore are better impregnated with glass to a greater depth than 1/16 of an inch. I have found it possible to impregnate bodies of the kind herein described to a depth of a full inch and as sometimes the articles made therefrom are no more than one inch thick, they may be impregnated with glass throughout and in such case there will be no base portion 11 and the entire structure will be that of the layer 12.

For cylinder liners and surface plates the surface of the layer 12 should be ground as by using a diamond grinding wheel, but for other articles such as the impeller blades mentioned grinding of the surface may not be necessary.

It is desirable that articles according to this invention be refractory. Aluminum oxide is refractory as well as hard. Fused alumina is relatively inexpensive and is harder than most of the other oxygen containing compounds.

In the surface layer 12 the glass 16 not only has no anastomosing pores but it also fills the interstices between the granules without leaving any anastomosing pores.

In Figure 1 the layer 12 is considered to be 1/16 of an inch thick so therefore Figure 1 itself represents a considerable magnification. Figure 2 is obviously a great magnification of a portion of Figure 1. Therefore in Figure 2 the individual granules 14 which are large enough in the drawing to be easily seen in reality represent very small particles.

The dense hard abrasion resistant refractory ceramic articles according to the invention are made out of crystalline aluminum oxide (also called alumina) which is originally in comminuted or granular form and at least 30% by volume of the articles consists of such aluminum oxide, the granules having been sintered and grown together and thus forming a continuous interlacing integral structure but with interstices. The granules are at least 90% pure aluminum oxide, $Al_2O_3$.

It will thus be seen that there has been provided by this invention an article and a method in which the various objects hereinabove set forth are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

Method of making a dense hard abrasion resistant ceramic article which comprises shaping a body out of at least 30% by volume of granules at least 90% pure of aluminum oxide, compacting and firing the body to cause said granules to grow together apart from any bond included therewith, then impregnating said body on at least one surface with molten glass to a depth of at least $\frac{1}{16}$ inch, the glass being fluid enough so as to fill all the interstices between granules with sufficient glass to produce an article to said depth without any anastomosing pores.

SAMUEL S. KISTLER.

REFERENCES CITED

The following references are of record in the file of this patent:

UNITED STATES PATENTS

| Number | Name | Date |
|---|---|---|
| 1,818,903 | Martin | Aug. 11, 1931 |
| 1,991,918 | Pick | Feb. 19, 1935 |
| 2,303,304 | Schleicher et al. | Nov. 24, 1942 |